(12) United States Patent
Lin et al.

(10) Patent No.: US 9,651,170 B2
(45) Date of Patent: May 16, 2017

(54) CHAIN AND CHAIN DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yu-Cheng Lin, Taipei (TW); Wei-Chih Sun, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/924,558

(22) Filed: Oct. 27, 2015

(65) Prior Publication Data
US 2017/0037985 A1 Feb. 9, 2017

(30) Foreign Application Priority Data

Aug. 4, 2015 (CN) ...................... 2015 2 0580793 U (51) Int. Cl.
| | |
|---|---|
| *F16G 13/14* | (2006.01) |
| *F16L 3/015* | (2006.01) |
| *F16L 3/26* | (2006.01) |
| *F16G 13/18* | (2006.01) |
| *H02G 11/00* | (2006.01) |

(52) U.S. Cl.
CPC ............. *F16L 3/015* (2013.01); *F16G 13/14* (2013.01); *F16G 13/18* (2013.01); *F16L 3/26* (2013.01); *H02G 11/00* (2013.01)

(58) Field of Classification Search
CPC ................................ F16G 13/14; H02G 11/00
USPC ........................................................... 59/78.1
See application file for complete search history.

(56) References Cited

U.S. PATENT DOCUMENTS

| | | | |
|---|---|---|---|
| 7,243,486 B1 * | 7/2007 | Ikeda ................... | H02G 11/006 248/49 |
| 7,249,452 B2 * | 7/2007 | Komiya ................. | F16G 13/16 248/49 |
| 7,882,690 B2 * | 2/2011 | Nehring ................. | F16G 13/16 248/49 |

* cited by examiner

*Primary Examiner* — David B Jones
(74) *Attorney, Agent, or Firm* — Li & Cai Intellectual Property (USA) Office (57) ABSTRACT

A chain including chain-link units pivotally connected with each other. Each chain-link unit includes two lateral plates, a first link plate and a second link plate. Two ends of the lateral plates are defined as a first end and a second end. Two first pin-joint parts are configured near the first ends of the lateral plates respectively, and two second pin-joint parts are configured near the second ends of the lateral plates respectively. The chain-link units are pivotally connected with each other via the first pin-joint part and the second pin-joint part. Thus, the chain-link units are common, and each can be the starting chain-link unit, the middle chain-link unit or the ending chain-link unit. They can be easily assembled without screws, which further reduce the time consumption. Moreover, the noise made as the chain works can be reduced, and a buffering function can also be provided.

9 Claims, 7 Drawing Sheets

CHAIN AND CHAIN DEVICE

BACKGROUND OF THE INVENTION

1. Field of the Invention

The instant disclosure relates to a chain and a chain device; in particular, to a chain and a chain device guiding and protecting the contained cables.

2. Description of Related Art

There are many cables used in the general tool machine, and the cables move as the tool machine is working. In order to make the cables move smoothly, there are chains (energy chains) needed to guide and protect the cables contained in the tool machine, and to monitor the minimum available bending radius.

The traditional chain (energy chain) comprises a plurality of chain-link units pivotally connected with each other, and the chain-link units comprise the starting chain-link unit, the ending chain-link unit and the middle chain-link unit, which have different structures and cannot be common. The starting chain-link unit and the ending chain-link unit are both fixed on the tool machine via screws, which makes the assembling difficult and additionally needs screws. In addition, as the chain moves, the area where each chain-link unit contacts the bearing surface is large and noise is produced easily.

SUMMARY OF THE INVENTION

In order to solve the above problem, this instant disclosure provides a chain and a chain device, wherein the chain-link units are common and can be operated as the starting chain-link unit, the middle chain-link unit and the ending chain-link unit. The starting chain-link unit and the ending chain-link unit can be easily assembled without screws, which further reduces the time consumption. Moreover, the noise that may be made as the chain works can be reduced, and a buffering function can also be provided.

The instant disclosure provides a chain, and the chain comprises a plurality of chain-link units pivotally connected with each other. Each of the chain-link units comprises two lateral plates, a first link plate and a second link plate. The two lateral plates have an interval therebetween, and two ends of the lateral plates defined as a first end and a second end. Two first pin-joint parts are configured near the first ends of the lateral plates respectively, and two second pin-joint parts are configured near the second ends of the lateral plates respectively. A first embedded portion is configured at one side of each lateral plate. The first link plate is connected to one side of the two lateral plates. The second link plate is connected to another side of the two lateral plates. A containing space is formed by the two lateral plates, the first link plate and the second link plate. A flexible arm is configured on the second link plate, and the flexible arm has a fastener. The chain-link units are pivotally connected with each other via the first pin-joint part and the second pin-joint part.

The instant disclosure further provides a chain device. The chain device comprises a chain and two retaining bases. Each retaining base has a base body, and the base body has two second embedded portions and a locating hole. The two first embedded portions of the starting chain-link unit and the ending chain-link unit are respectively embedded into the two second embedded portions of the two retaining bases. The fasteners of the starting chain-link unit and the ending chain-link unit respectively fasten at the locating holes of the two retaining bases.

The chain provided by the instant disclosure comprises a plurality of chain-link units pivotally connected with each other, and the chain-link units are common. The chain-link units can be the starting chain-link unit, the middle chain-link unit or the ending chain-link unit, and the starting chain-link unit and the middle chain-link unit are fastened by a fastener. Thus, they can be easily assembled without screws, which further reduces the time consumption.

In addition, each chain-link unit in the instant disclosure has a flexible arm, and the flexible arm has a fastener. The fasteners of the starting chain-link unit and the ending chain-link unit can fasten to the locating holes of the retaining base, for flexibly fixing the starting chain-link unit and the ending chain-link unit. Also, the fastener of the middle chain-link unit can flexibly contact the bearing surface of the tool machine. Thus, when the chain starts working, the area where each chain-link unit contacts the bearing surface would be small, the noise can be reduced, and a buffering function is provided. Moreover, there are fewer elements used in the instant disclosure, which lowers the cost and prevents errors when assembling.

For further understanding of the instant disclosure, reference is made to the following detailed description illustrating the embodiments and embodiments of the instant disclosure. The description is only for illustrating the instant disclosure, not for limiting the scope of the claims.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The First Embodiment

Figure 1:
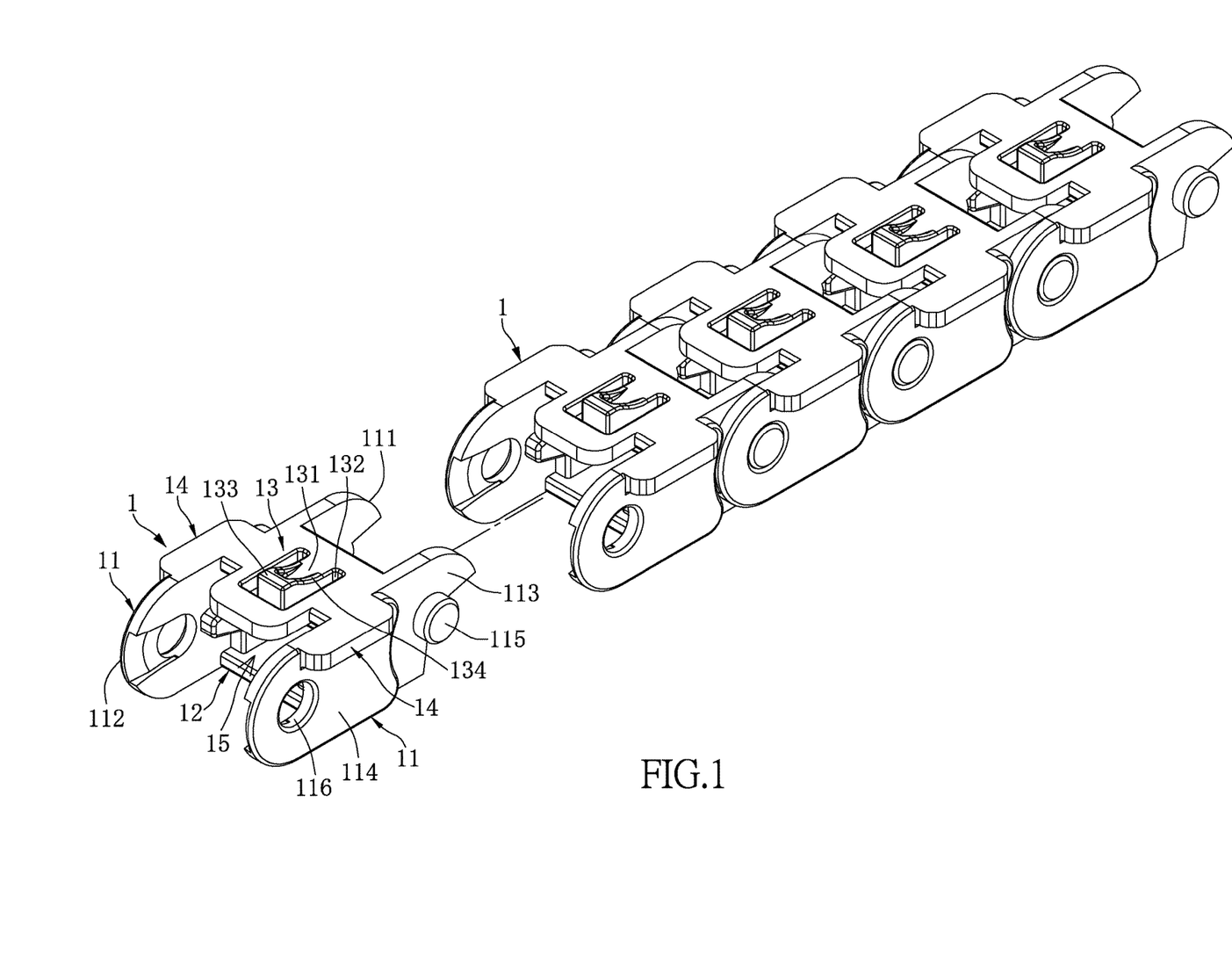
FIG. 1 shows a three dimensional diagram of a chain of one embodiment of the instant disclosure.
Figure 2:
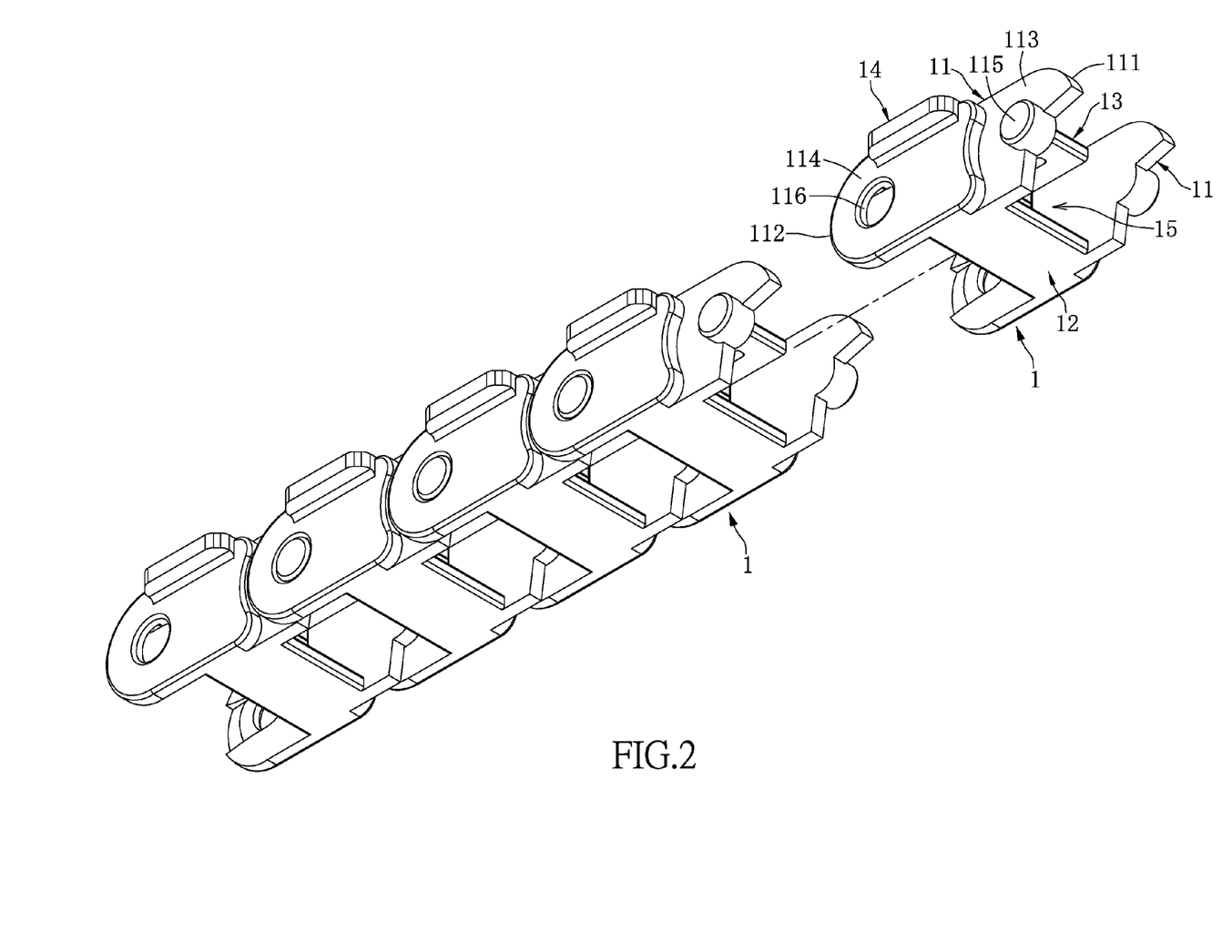
FIG. 2 shows another three dimensional diagram of a chain of one embodiment of the instant disclosure from a different angle.

In conjunction with FIG. 1 and FIG. 2, the instant disclosure provides a chain (an energy chain), wherein the chain can contain cables or the like and thus the contained cables or the like can be guided and protected. The chain comprises a plurality of chain-link units 1 that are pivotally connected with each other. The chain-link units 1 are made of plastic or metal material; however, it is not limited herein. Each chain-link unit 1 comprises two lateral plates 11, a first link plate 12 and a second link plate 13.

Figure 3:
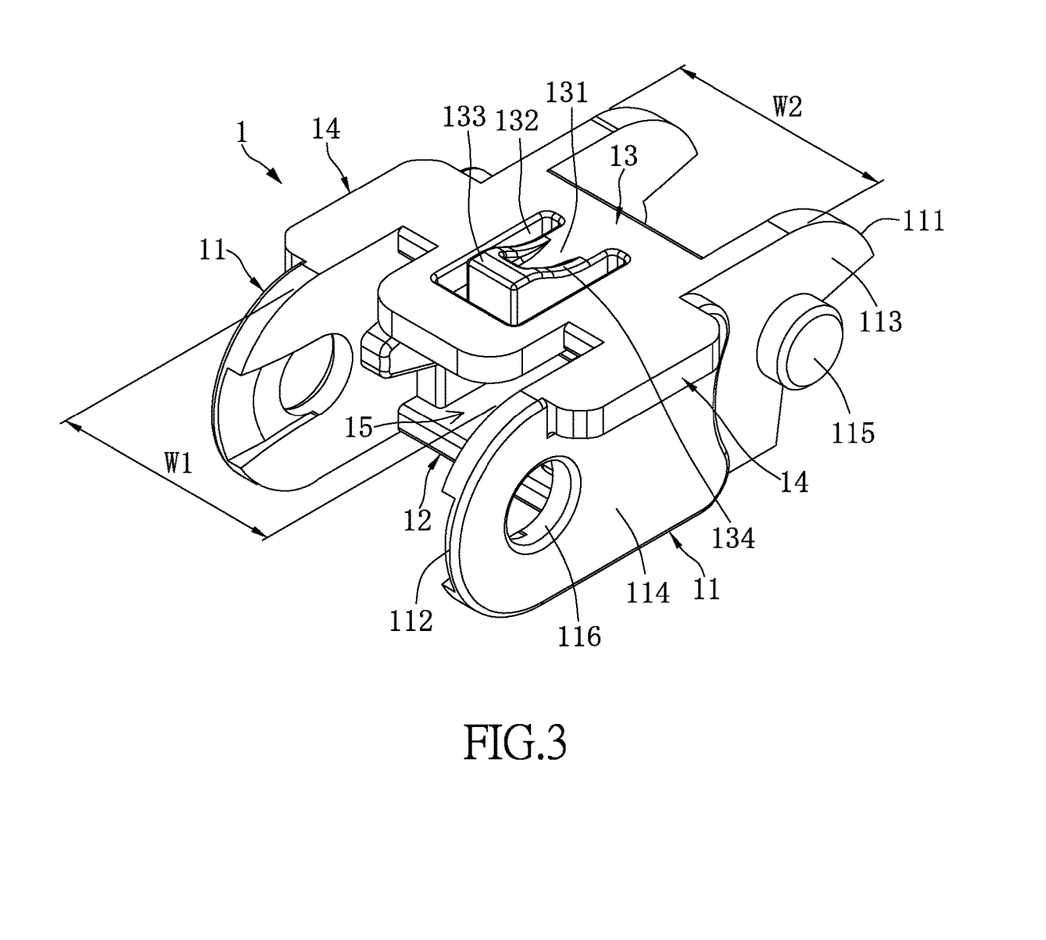
FIG. 3 shows a three dimensional diagram of a chain-link unit of one embodiment of the instant disclosure.
Figure 4:
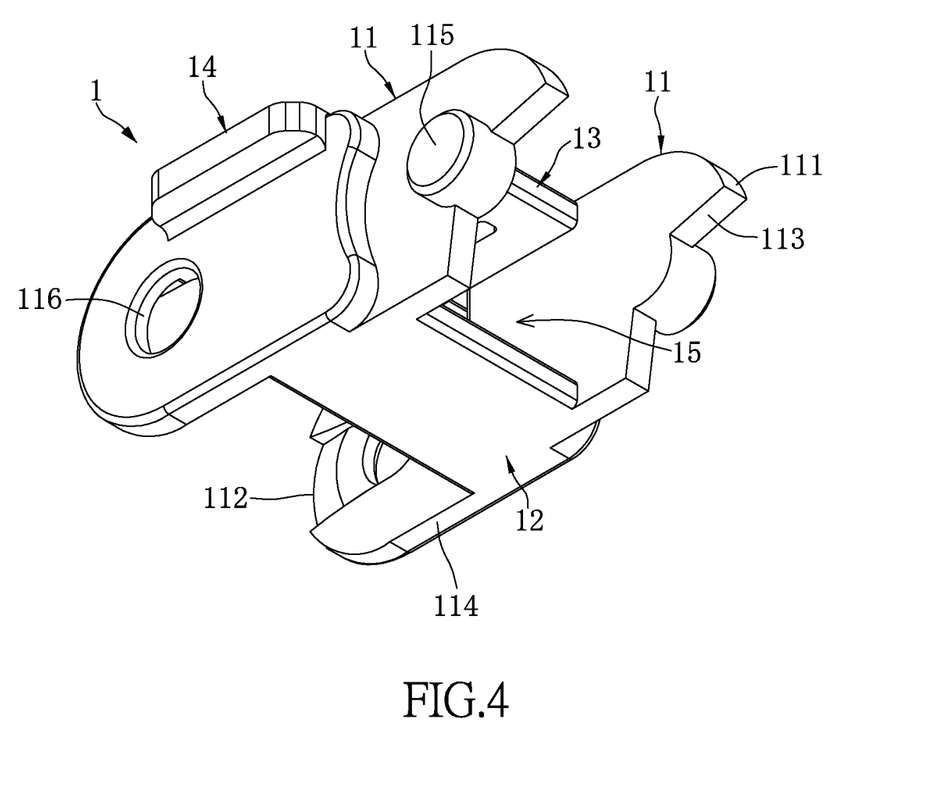
FIG. 4 shows another three dimensional diagram of a chain-link unit of one embodiment of the instant disclosure from a different angle.

In conjunction with FIG. 3 and FIG. 4, the two lateral plates 11 have an interval therebetween. That is, the two lateral plates 11 are configured at two sides of the chain-link unit 1 (such as the left side and the right side), and the two lateral plates 11 are both up-right and parallel with each other. Two ends of the lateral plates are defined as a first end 111 and a second end 112. Each lateral plate 11 can be further distinguished as a first plate body 113 and a second plate body 114. The first plate body 113 is near the first end 111 of the lateral plate 11, and the second plate body 114 is near the second end 112 of the lateral plate 11. The interval between the two first plate bodies 113 is different from the interval between the two second plate bodies 114. Specifically speaking, the interval W1 between the inner edges of the two second plate bodies 114 can be equal to or larger than the interval W2 between the outer edges of the two first plate bodies 113, such that the combination of the first plate body 113 and the second plate body 114 can be ladder-shaped. As the chain-link units 1 are pivotally connected with each other, the two first plate bodies 113 of each chain-link unit 1 can be configured between the two second plate bodies 114 of another chain-link unit 1, such that the chain-link units 1 can be connected in series, and the two outer edges of the chain-link units 1 can be level.

Two first pin-joint parts 115 are configured near the first ends 111 of the lateral plates 11 respectively, and two second pin-joint parts 116 are configured near the second ends 112 of the lateral plates 11 respectively. The first pin-joint part 115 and the second pin-joint part 116 can be a pivot shaft, an axle hole or the like. The first pin-joint part 115 can be configured on the first plate body 113, and the second pin-joint part 116 can be configured on the second plate body 114. In this embodiment, the first pin-joint part 115 is a pivot shaft, and the pivot shaft integrally protrudes from the outer edge of the lateral plate 11. In other words, the first pin-joint part 115 can protrude from the outer edge of the lateral plate 11. The second pin-joint part 116 is an axle hole that passes through the inner edge and the second plate body 114 of the lateral plate 11.

A first embedded portion 14 is configured at one side of each lateral plate 11, such as the top side, and the first embedded portion 14 can be fastened at a predetermined position. The first embedded portion 14 is formed by outward extending one side of the lateral plate 11. The first embedded portion 14 can be plate-shaped and horizontal. The first embedded portion 14 can be perpendicular to the lateral plate 11. The shape and the structure of the first embedded portion 14 are not restricted herein, as long as the first embedded portion 14 can be fixed at the predetermined position.

The first link plate 12 is connected to one side of the two lateral plates 11, such as the bottom side, and the first link plate 12 can be horizontal. The second link plate 13 is connected to another side of the two lateral plates 11, such as the top side. The second link plate 13 can also be horizontal and parallel with the first link plate 12. In this embodiment, the first link plate 12 is integrally connected to one side of the two lateral plates 11, and the second link plate 13 is integrally connected to another side of the two lateral plates 11, such that the chain-link unit 1 can be integrally structured, which provides the structure solidity and convenience for assembling. A containing space 15 can be formed by the two lateral plates 11, the first link plate 12 and the second link plate 13, so as to contain cables. The two ends of the containing space 15 have openings that the cables can pass through.

A flexible arm 131 is configured on the second link plate 13, and the flexible arm 131 is formed via a U-shaped groove 132 in the second link plate 13, wherein the flexible arm 131 is configured within the U-shaped groove 132. One end of the flexible arm 131 is connected to the second link plate 13, and another end of the flexible arm 131 is a free end, such that the flexible arm 131 can swing flexibly. The flexible arm 131 has a fastener 133, and the fastener 133 is projected from the outer edge of the flexible arm 131. The fastener 133 is near another end of the flexible arm 131 (a free end), and the fastener 133 protrudes from the outer edge of the flexible arm 131 and the second link plate 13, for fastening and flexibly contacting. A guide surface 134 is formed between the fastener 133 and the outer edge of the flexible arm 131, and the guide surface 134 is an oblique surface or an arc surface, to guide the fastener 133 to make fastening smooth and contacting flexible.

The chain-link units 1 are pivotally connected with each other via the first pin-joint part 115 and the second pin-joint part 116, to form a strip-shaped chain. The amount of the chain-link units 1 is not limited herein, and it can be adjusted depending on needs.

The Second Embodiment

In this embodiment, each of the chain-link units 1 is common, and each of the chain-link units 1 can be a starting chain-link unit, an ending chain-link unit or a middle chain-link unit. In conjunction with FIG. 5 and FIG. 6, the chain-link units 1 used as the starting chain-link unit and the ending chain-link unit can be respectively fixed on two retaining bases 2. The two retaining bases 2 respectively have a base body 21, and the base body 21 can be plate-shaped or be bent to be L-shaped, wherein the shape of the base body 21 is not limited herein. The base body 21 can be formed integrally or combined at the proper position on a machine tool (such as a machine casing or a movable element).

Figure 5:
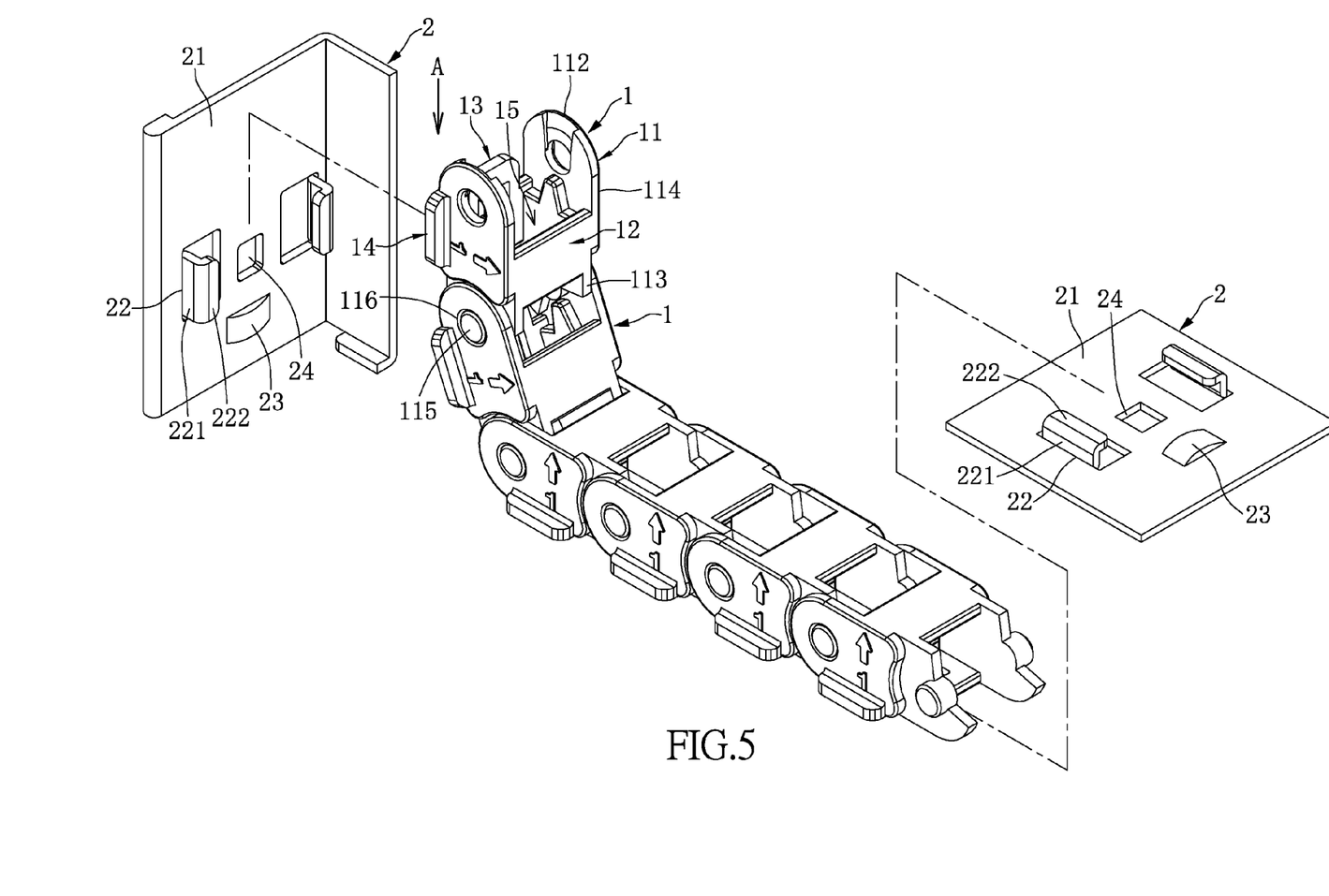
FIG. 5 shows a three dimensional exploded view of a chain device of one embodiment of the instant disclosure.
Figure 6:
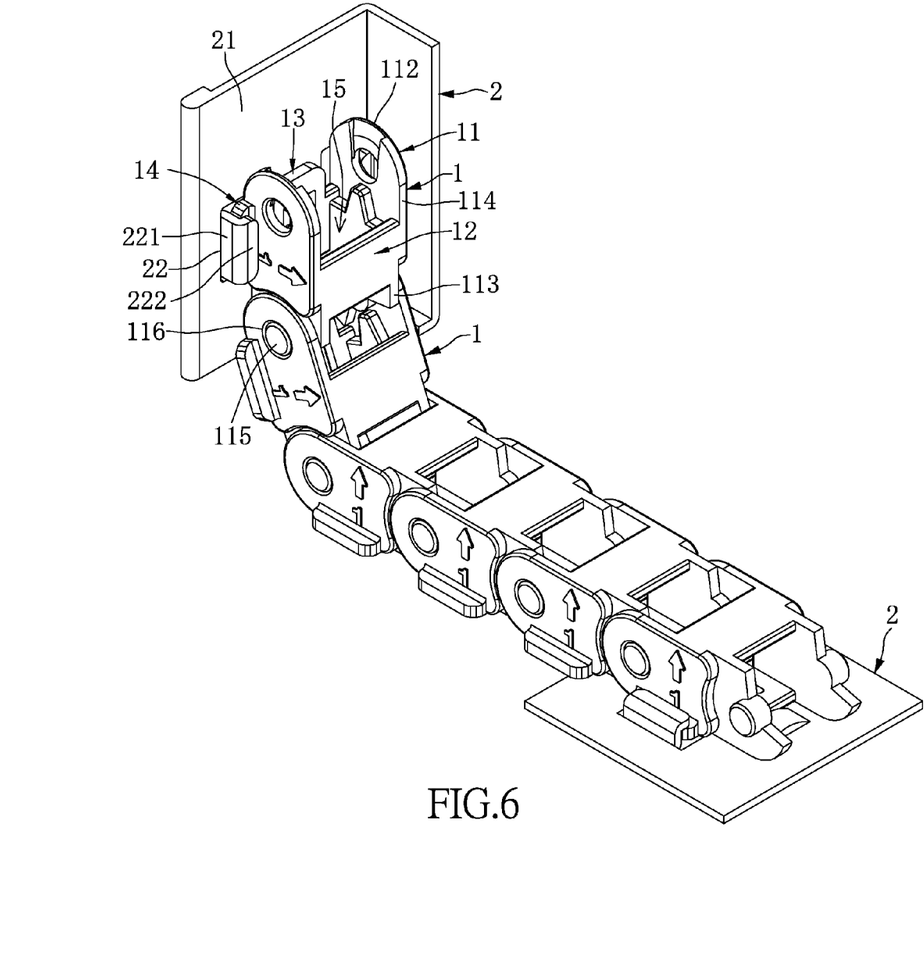
FIG. 6 shows a three dimensional diagram of a chain device of one embodiment of the instant disclosure.

Two second embedded portions 22 are projected from the base body 21. The two second embedded portions 22 are configured oppositely, and protrude from one surface of the base body 21, to fasten with the first embedded portions 14 of the starting chain-link unit and the ending chain-link unit. In this embodiment, the second embedded portion 22 can be bent to be L-shaped, to provide a better guiding and position limiting effect. In other words, the second embedded portion 22 has a lateral plate 221 and an end plate 222. The lateral plate 221 is formed by vertically extending one side of the base body 21, and the end plate 222 is formed by vertically extending one end of the lateral plate 221 wherein the end of the lateral plate 221 is away from the base body 21, such that the end plates 222 of the two second embedded portions 22 extend oppositely.

It is preferred but not limiting that, a stop portion 23 is projected from the base body 21, and the stop portion 23 protrudes from one surface of the base body 21. That is, the stop portion 23 and the two second embedded portions 22 protrude from the same surface of the base body 21, and the stop portion 23 is near one end of the two second embedded portions 22 (the terminal end). The shape of the stop portion 23 is not limited herein. In this embodiment, the stop portion 23 is square and is an arc convex, to provide the stopping and positioning function.

The base body 21 has a locating hole 24, and the locating hole 24 is configured between the two second embedded portions 22. The locating hole 24 is a through hole corresponding to the fastener 133. The locating hole 24 is square in this embodiment, but the shape of the locating hole 24 is not limited herein.

Figure 7:
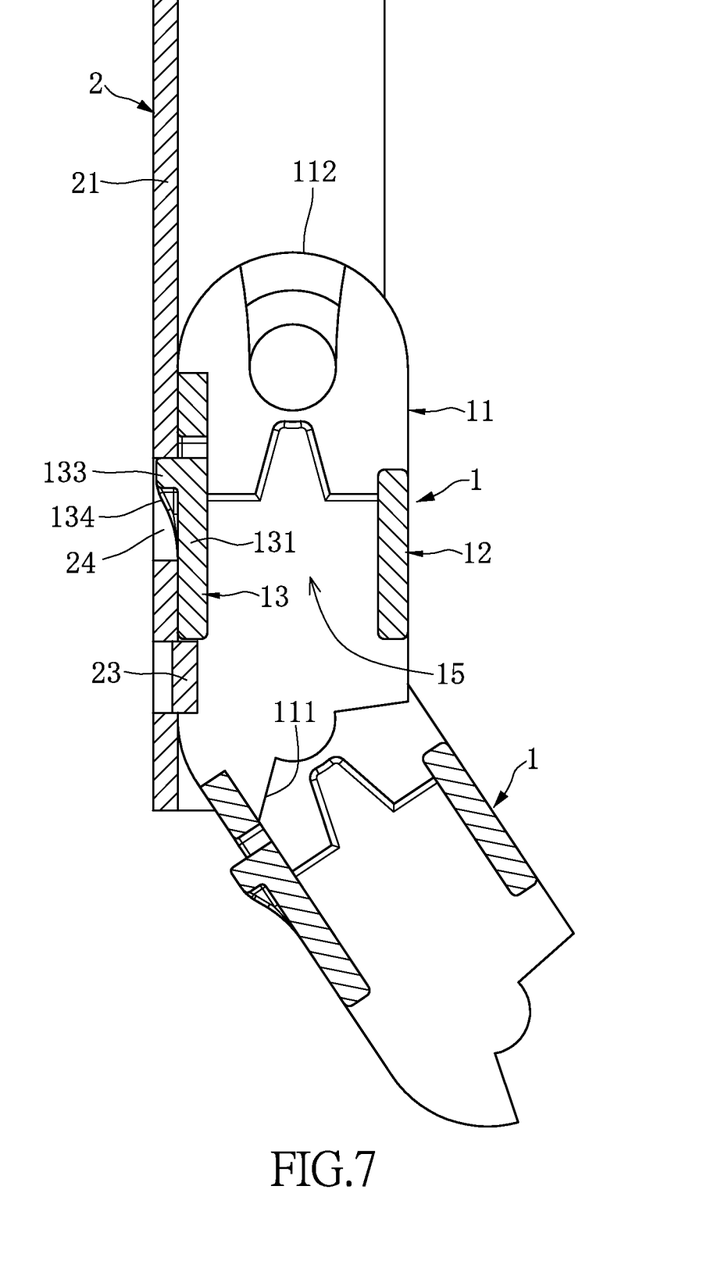
FIG. 7 shows a sectional view of a chain device of one embodiment of the instant disclosure.

Two first embedded portions 14 of the chain-link units 1, when used as the starting chain-link unit and the ending chain-link unit, are respectively fastened to the corresponding two second embedded portions 22, the inner edges of the lateral plate 221 and the end plate 222 of the two second embedded portions 22 along an assembling direction A, as shown in FIG. 5 and FIG. 6, to provide a better guiding and position limiting effect. As the two first embedded portions 14 of the starting chain-link unit and the ending chain-link unit are fastened to the corresponding two second embedded portions 22 at the predetermined positions, one end of the second link plate 13 of the chain-link unit 1 contacts the stop portion 23 and then is positioned, as shown in FIG. 7, such that the chain-link unit 1 is stopped and cannot move forward. As the two first embedded portions 14 of the starting chain-link unit and the ending chain-link unit are fastened to the corresponding two second embedded portions and positioned, the fastener 133 fastens to the locating hole 24, such that the starting chain-link unit and the ending chain-link unit can be solidly fastened to the two retaining bases 2. The first embedded portion 14 and the second embedded portion 22 can be separated only when the fastener 133 is pushed to leave the locating hole 24. The above chain and the two retaining bases 2 are combined as a chain device.

The chain provided by the instant disclosure can guide and protect the contained cables and monitor the minimum available bending radius. The chain provided by the instant disclosure comprises a plurality of chain-link units 1 pivotally connected with each other, and the chain-link units 1 are common. The chain-link units 1 can be used as the starting chain-link unit, the middle chain-link unit and the ending chain-link unit, and the starting chain-link unit and the middle chain-link unit are fastened by the fastener. Thus, they can be easily assembled without screws, and thus the time consumption can be reduced.

In addition, each chain-link unit 1 in the instant disclosure has a flexible arm 131, and the flexible arm 131 has the fastener 133. The flexible arms 131 of the starting chain-link unit and the ending chain-link unit can fasten to the locating hole 24 of the retaining base 2, for flexibly fixing the starting chain-link unit and the ending chain-link unit. Also, the flexible arms 131 of the middle chain-link unit can flexibly contact the bearing surface of the tool machine. Thus, when the chain starts working, the area where each chain-link unit 1 contacts the bearing surface can be small, the noise can be reduced, and a buffering function is provided. Moreover, there are fewer elements used in the instant disclosure, which lowers the cost and prevents errors when assembling.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A chain, comprising a plurality of chain-link units pivotally connected with each other, and each of the chain-link units comprising:
   two lateral plates, having an interval therebetween, two ends of the lateral plates defined as a first end and a second end, two first pin-joint parts configured near the first ends of the lateral plates respectively, two second pin-joint parts configured near the second ends of the lateral plates respectively, and a first embedded portion projected from one side of each lateral plate;
   a first link plate, connected to one side of the two lateral plates; and
   a second link plate, connected to another side of the two lateral plates, a containing space formed by the two lateral plates, the first link plate and the second link plate, a flexible arm configured on the second link plate, and the flexible arm having a fastener;
   wherein a U-shaped groove is configured on the second link plate, the flexible arm is configured within the U-shaped groove, one end of the flexible arm is connected to the second link plate, another end of the flexible arm is a free end, the fastener is configured at the outer edge of the flexible arm, and the fastener protrudes from the edge of the second link plate;
   wherein the chain-link units are pivotally connected with each other via the first pin-joint part and the second pin-joint part.

2. The chain according to claim 1, wherein the first embedded portion is formed by outward extending one side of the lateral plate, the first embedded portion is plate-shaped and the first embedded portion is perpendicular to the lateral plate.

3. The chain according to claim 1, wherein a guide surface is formed between the fastener and the edge of the flexible arm, and the guide surface is an oblique surface or an arc surface.

4. The chain according to claim 1, wherein the two lateral plates respectively have a first plate body and a second plate body, the first plate body is near the first end of the lateral plate, the second plate body is near the second end of the lateral plate, the interval between the inner edges of the two second plate bodies is larger than or equal to the interval between the outer edges of the two first plate bodies, and the two first plate bodies of each chain-link unit is configured between the two second plate bodies of the another adjacent chain-link unit.

5. The chain according to claim 1, wherein the first pin-joint part is a pivot shaft, the pivot shaft integrally protrudes from the outer edge of the lateral plate, the second pin-joint part is a pivot hole, and the pivot hole passes through the inner edge and the outer edge of the lateral plate.

6. The chain according to claim 1, wherein the first link plate is integrally connected to one side of the two lateral plates, and the second link plate is integrally connected to another side of the two lateral plates.

7. A chain device, comprising:
   a chain, comprising a plurality of chain-link units pivotally connected with each other, and each of the chain-link units comprising:
      two lateral plates, having an interval therebetween, two ends of the lateral plates defined as a first end and a second end, two first pin-joint parts configured near the first ends of the lateral plates respectively, two second pin-joint parts configured near the second ends of the lateral plates respectively, and a first embedded portion projected from one side of each lateral plate;
      a first link plate, connected to one side of the two lateral plates; and
      a second link plate, connected to another side of the two lateral plates, a containing space formed by the two lateral plates, the first link plate and the second link plate, a flexible arm configured on the second link plate, and the flexible arm having a fastener;
   and
   two retaining bases, each retaining base having a base body, the base body having two second embedded portions and a locating hole, the two first embedded portions of a starting chain-link unit and an ending chain-link unit are respectively embedded into the two second embedded portions of the two retaining bases, and the fasteners of the starting chain-link unit and the ending chain-link unit respectively fastening at the locating holes of the two retaining bases.

8. The chain device according to claim 7, wherein a stop portion is projected from the base bodies of each retaining base, the stop portion and the two second embedded portions protrude from the same surface of the base body, and one end of the second link plate of the starting chain-link unit and one end of the second link plate of the ending chain-link unit abuts the stop portion and stay.

9. The chain device according to claim 7, wherein the second embedded portion has a lateral plate and an end plate, the lateral plate is formed by vertically extending one side of the base body, and the end plate is formed by vertically extending one end of the lateral plate and the end of the lateral plate is away from the base body vertically.

* * * * *